United States Patent [19]
Sanders

[11] Patent Number: 4,679,593
[45] Date of Patent: Jul. 14, 1987

[54] SOLENOID VALVE

[75] Inventor: Robert K. Sanders, Lebanon, Ind.

[73] Assignee: General Motors Corporation, Detroit, Mich.

[21] Appl. No.: 908,737

[22] Filed: Sep. 18, 1986

[51] Int. Cl.[4] ............................................. F15B 13/044
[52] U.S. Cl. ............................ 137/625.65; 251/129.22
[58] Field of Search ............... 137/625.65; 251/129.22

[56] References Cited

U.S. PATENT DOCUMENTS

| | | | |
|---|---|---|---|
| 4,354,662 | 10/1982 | Thompson | 137/625.65 X |
| 4,513,780 | 4/1985 | Evans | 137/625.65 |

Primary Examiner—Gerald A. Michalsky
Attorney, Agent, or Firm—Donald F. Scherer

[57] ABSTRACT

A solenoid valve has a valve body in which a valve spool is slidably disposed. The valve spool has a central longitudinal opening in which a central core and a selectively energizable coil are coaxially positioned. The coil establishes a magnetic field when energized. The core and coil extend for approximately the full length of the valve spool such that during movement of the valve spool, a substantially constant air gap is maintained. The valve body has fluid passages formed therein. Fluid communication between the passages is controlled by linear movement of the valve spool along the coil and core inducted by the magnetic forces.

2 Claims, 1 Drawing Figure

U.S. Patent  Jul. 14, 1987  4,679,593
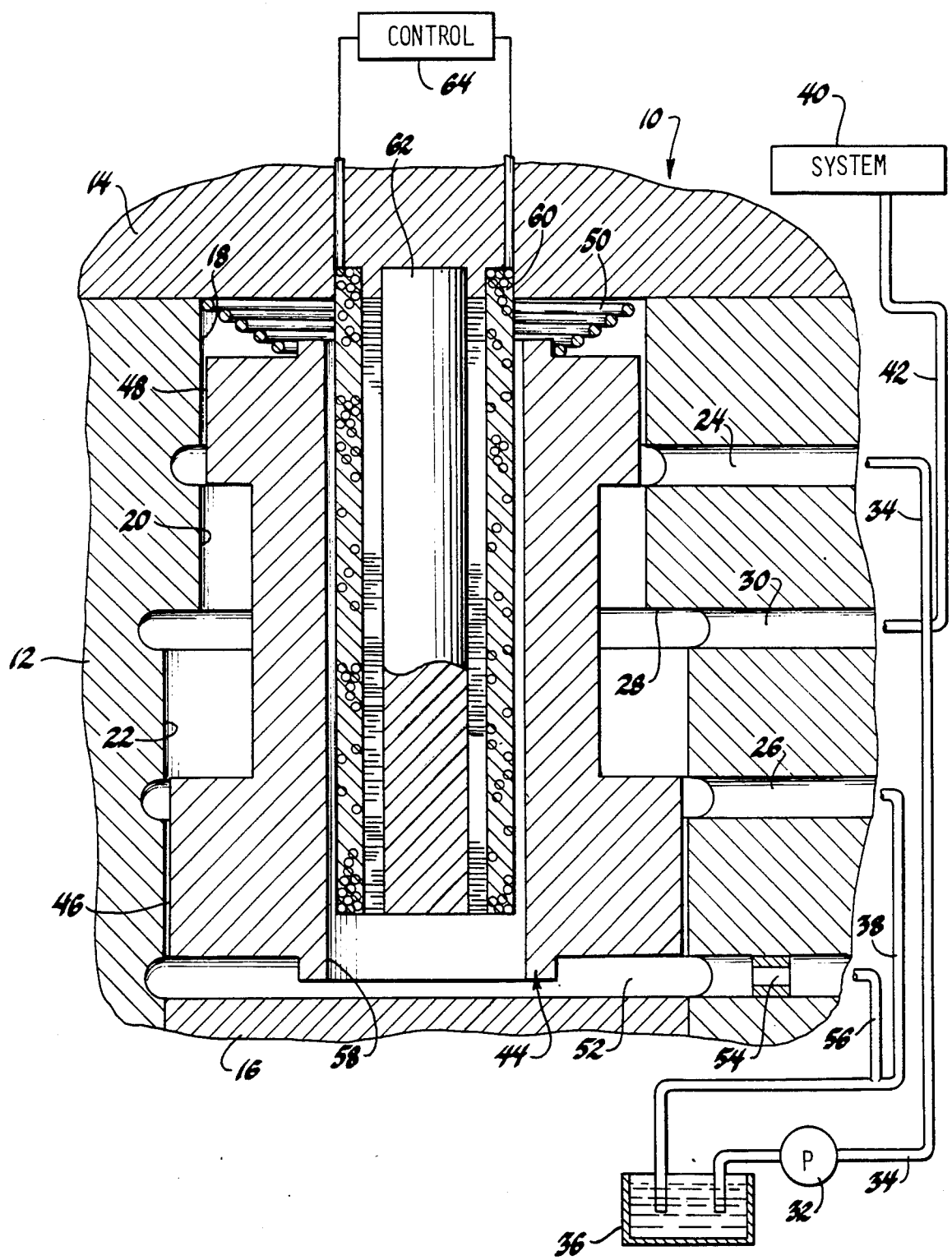

SOLENOID VALVE

BACKGROUND OF THE INVENTION

This invention relates to fluid control valves and more particularly to solenoid-operated fluid control valves.

The prior art has shown numerous solenoid-operated three-way valves which are operable to control fluid flow between a pressure port and a control port, and also between the control port and an exhaust port.

Most recently, these valves have taken the form of a spherical element disposed in a valve bore and acted upon by magnetic forces. These valves are efficient and require very slight movement of the spherical member, however, these valves do not permit large amounts of fluid flow per unit time.

In an effort to increase the volume per unit time of fluid flowing through the valve, spool valves or slidable sleeve valves, such as that shown in U.S. Pat. No. 4,513,780 to Evans issued Apr. 30, 1985, and assigned to the assignee of the present invention, are utilized. These valves require fairly large diameters to accommodate the valve spool and the solenoid coil.

SUMMARY OF THE INVENTION

The present invention improves upon these prior art devices by providing for the control of large fluid flow rates in a valve assembly having a small outer diameter.

The present invention accomplishes this by providing a central core member of magnetic material which is surrounded by a selectively energizable solenoid coil. The valve spool is disposed coaxially with both the core and coil; while the fluid passages controlled by the valve spool are disposed at the outer diameter thereof. By providing the passages at the outer diametral limits of the valve spool, larger fluid ports and therefor larger flow rates of fluid are permitted without an excessive pressure drop. By positioning the core and coil at the inner diameter of the spool, a more compact overall diameter of the valve is established. This structure does provide for a lengthening of the overall valve, however, the total space requirement is reduced.

The magnetic path established by the magnetic field of the coil encompasses both the valve spool and the core such that improved concentration of the magnetic forces is accomplished and the power requirement to operate the valve is reduced. By positioning the fluid ports at the outer diameter of the valve spool, a short operating stroke for the valve spool is attained thereby improving the response time while simultaneously providing a substantially or nearly constant air gap.

It is therefore an object of this invention to provide an improved solenoid valve wherein a valve spool, slidably disposed in a valve body, has a longitudinal central opening into which a magnetizable core and a selectively energizable coil extend whereby the sliding movement of the valve spool is controlled which in turn controls fluid flow through passages formed in the valve body.

It is another object of this invention to provide an improved solenoid valve wherein a valve body houses a spring positioned slidable valve spool and cooperates with the outer periphery thereof to establish fluid communication between a plurality of passages formed in the housing, and further wherein the valve spool has a central longitudinally extending opening in which is disposed a magnetizable core and solenoid coil, surrounding the core, and being selectively energizable to establish a magnetic field having a path encompassing the core and the valve spool to urge the valve spool against the spring whereby the fluid communication between the passages is controlled.

It is a further object of this invention to provide an improved solenoid valve wherein the spool portion of the valve has a central longitudinal opening into which extends a selectively energizable coil surrounding a magnetizable core and wherein the magnetic path established by the magnetic field of the coil includes the spool and the core, and wherein the spool portion has a stepped outer diameter responsive to fluid pressure to urge the spool portion in a direction opposite to the urging direction of the magnetic field.

These and other objects and advantages of the present invention will be more apparent from the following description and drawing.

DESCRIPTION OF THE DRAWING

The drawing is a diagrammatic representation of the invention.

DETAILED DESCRIPTION

There is seen in the drawing a valve assembly, generally designated 10, having a body 12 and a pair of end caps 14 and 16. In the alternative, the end cap 14 can be made integral with the body 12 if desired.

The body 12 has formed therein a stepped diameter bore 18 having a small diameter bore 20 and a large diameter bore 22. The small diameter bore 20 is in fluid communication with a pressure port 24 and the large diameter bore 22 is in fluid communication with an exhaust port 26. At the point of juncture, designated 28, between the diameters, there is disposed a control port 30.

The pressure port 24 is in fluid communication with a conventional fluid pump 32 through a passage 34. The exhaust port 26 is in fluid communication with a fluid reservoir 36 through a passage 38. The control port 30 is in fluid communication with a fluid system 40 through a passage 42. The fluid system 40 may be a conventional power transmission control system, a machine tool control system, or substantially any fluid control system which utilizes a pressure control valve.

A valve spool 44 is slidably disposed in the stepped bore 18. The valve spool 44 has a large diameter land 46 disposed in the large diameter 22 and a small diameter land 48 disposed in the small diameter 20. These lands 46 and 48 are shown with exaggerated clearances between the outer diameter of the lands and the inner diameter of the bore. These clearances are shown exaggerated merely for the purpose of clarity. During design and construction of a valve incorporating the present invention, conventional sliding valve clearances would be utilized.

The space between the valve lands 46 and 48 is in fluid communication with the control port 30. A valve spring shown as a volute spring 50 is disposed between end cap 14 and the end of valve spool 44 adjacent the small diameter land 48. The spring 50 urges the valve spool against the end cap 16 which is in a downward direction as viewed in the drawing. When the valve spool 44 is in abutting relation with the end cap 16, the pressure port 24 will be closed from control port 30 by the land 48 while the control port 30 will be open to the exhaust port 26 by the land 46.

The space between the large diameter end of valve spool 44 and the end cap 16 is designated as 52. This space is in fluid communication through a restriction 54 and a passage 56 with the passage 38 and reservoir 36. The connection of area 52 with the reservoir 36 prevents the development of pressure on the end of valve spool 44. The presence of the restriction 54 prevents rapid large linear movements of the valve spool 44. This combination of area 52 and restriction 54 provides a well-known dash pot or damper for the valve.

The valve spool 44 has formed therein a longitudinal central opening 58 which extends from one end of the valve spool to the other. A solenoid coil 60 is disposed in the opening 58 and extends coaxially with the valve spool 44. A core member 62 is secured in the end cap 14 and extends coaxially with the valve spool 44 and the solenoid coil 60. The solenoid coil 60 is controlled by a conventional electrical control system 64.

The control system 64 may be a pulse-width-modulated source or a stepped current or voltage source or any of the other well-known electrical controls utilized for solenoid controls. When the coil 60 is energized, a magnetic field is established which induces a magnetic path through the core 62 and the valve spool 44. This creates magnetic forces which urge the valve spool against the spring 50 in an upward direction as seen in the drawing. Extended movement of the valve spool 44 against the spring 50 will result in the opening of pressure port 24 by land 48 and the closing of exhaust port 26 by land 46.

When the pressure port 24 is opened, the control port 30 will be in fluid communication therewith such that fluid under pressure will be transmitted to the system 40. As the pressure at the control port 30 increases, the pressure operating on the differential area between lands 48 and 46 will also increase. This pressure urges the valve spool downward assisting the spring in overcoming the magnetic force established by the coil 60.

When these forces are balanced (spring force plus pressure force equals magnetic force) the valve spool will be in equilibrium and the desired pressure force will be established at the control port 30. If a higher pressure is required, the magnetic force will be increased by the control 64. If a lower pressure is desired, the magnetic force will be decreased by the control 64.

From the above description it should be apparent that within a given range, substantially infinitely variable pressure levels are obtainable with this system. By utilizing a pulse-width-modulated control with feedback signals from the system 40, it should be apparent that the sophisticated control pressures and changes thereof can be established. During operation of the valve, there will be some leakage between the valve land 48 and the bore 20. This leakage will pass through the central opening 58 thereby providing cooling fluid for the coil 60 to eliminate the possibility of valve overheat.

The differential area between lands 48 and 46 permits a wider operating range for the valve with a given spring force. It also permits the spring 50 to be utilized as merely an "at rest" setting device rather than a pressure controlling device. The drawing shows the overlap between the pressure port 24 and the exhaust port 26 to be essentially zero. As is well-known in valve spool design, this overlap can be increased or decreased as desired, to obtain the pressure in flow relationships which are sought during the control function. Valve overlap is generally utilized to restrict or otherwise decrease the amount of valve spool movement when the steady state control pressure has been achieved. If the system being controlled requires substantial fluid flow, then the need for valve overlap decreases.

By placing the ports 24, 26 and 30 at the outer diameter of the valve spool, larger flow areas are provided. Because of the large flow areas, only a short stroke of the valve spool is required for fluid control. This, of course, provides for a rapid response time. Also, since the linear movement of the valve spool 44 is short, the air gap between the valve spool and the coil is substantially constant.

The embodiments of the invention in which an exclusive property or privelege is claimed are defined as follows:

1. A solenoid valve comprising: a valve body having a valve bore therein; a valve spool slidably disposed in said valve body and including two spaced valve lands formed on the outer circumference thereof, a fluid flow channel between said valve lands and a longitudinally extending central bore; a magnetic core member secured in said valve body and extending into said central bore of said valve spool; a solenoid coil disposed circumjacent said core member for substantially the entire length therof; spring means disposed between a portion of said valve body and one end of said valve spool for urging said valve spool in one longitudinal direction; pressure passage means formed in said valve body and communicating with said valve bore adjacent one of said valve lands; exhaust passage means formed in said valve body and communicating with said valve bore adjacent the other of said valve lands; and control passage means formed in said valve body in fluid communication with said valve bore adjacent said fluid flow channel, said spring means being operable to urge the valve spool in said one longitudinal direction to selectively permit fluid communication between said control passage means and one of said pressure passage means and exhaust passage means, and said solenoid coil being selectively energized to cause a magnetic field urging said valve spool in the other longitudinal direction to selectively permit fluid communication between said control passage means and the other of said pressure passage means and said exhaust passage means.

2. A solenoid valve comprising: a valve body having a stepped diameter valve bore therein; a valve spool slidably disposed in said valve body and including two spaced valve lands, a fluid flow channel between said valve lands and a longitudinally extending central bore, said lands being of a small diameter and a large diameter respectively with a differential area therebetween in fluid communication with said flow channel; a magnetic core member secured in said valve body and extending into said central bore of said valve spool; a solenoid coil disposed circumjacent said core member for substantially the entire length thereof; spring means disposed between a portion of said valve body and one end of said valve spool adjacent said small diameter land for urging said valve spool in one longitudinal direction; pressure passage means formed in said valve body and communicating with said valve bore adjacent one of said valve lands; exhaust passage means formed in said valve body and communicating with said valve bore adjacent the other of said valve lands; and control passage means formed in said valve body in fluid communication with said valve bore adjacent said fluid flow channel, said spring means being operable to urge the valve spool in said one longitudinal direction to selectively permit fluid communication between said control passage means and one of said pressure passage means and exhaust passage means, said solenoid coil being selectively energized to cause a magnetic field urging said valve spool in the other longitudinal direction to selectively permit fluid communication between said control passage means and the other of said pressure passage means and said exhaust passage means, and the pressure in said control passage means acting on said differential area to urge said valve means in concert with said spring means against the urging of the magnetic field.

* * * * *